G. C. HURRELL.
FILTER AND FILTER PRESS.
APPLICATION FILED SEPT. 27, 1921.

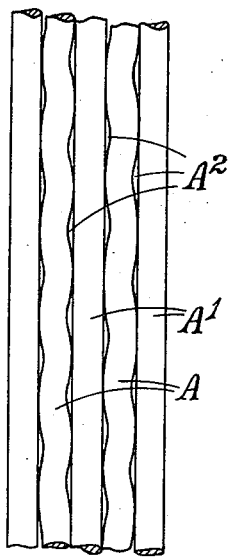
Fig. 1.
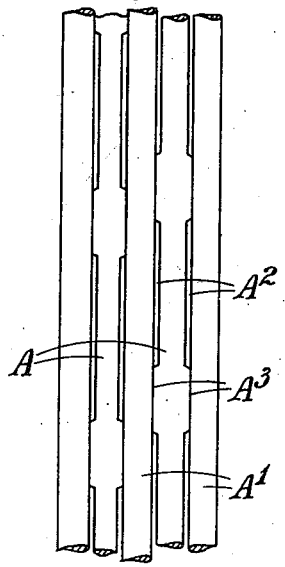
Fig. 2.
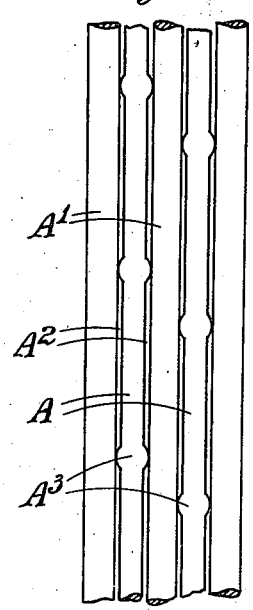
Fig. 2ᴬ.
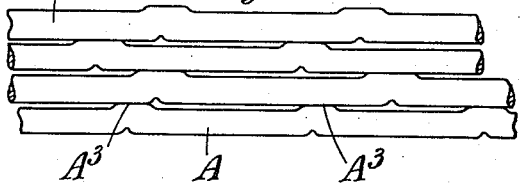
Fig. 3.
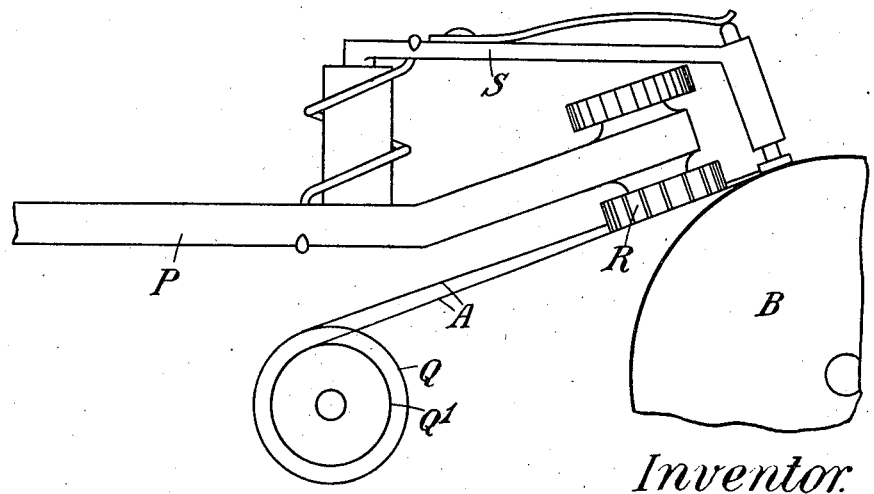
Fig. 4.

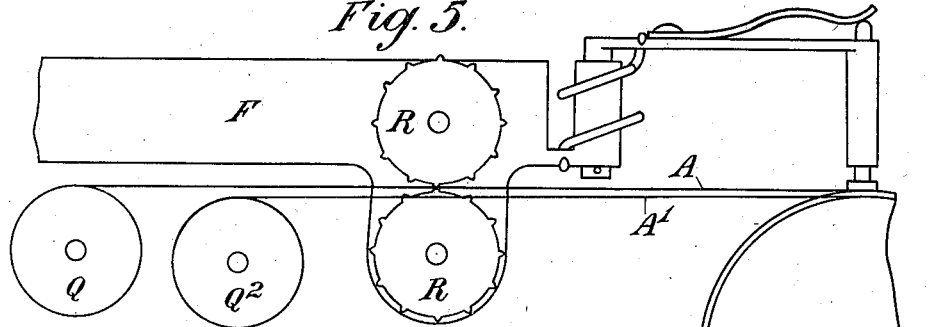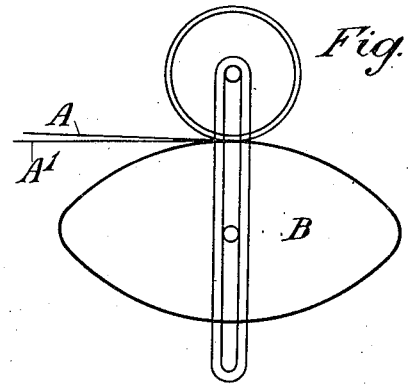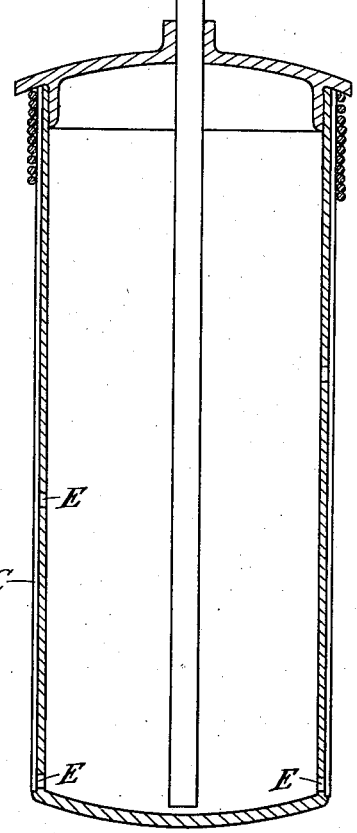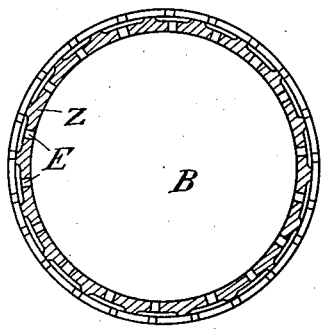

1,414,132.

Patented Apr. 25, 1922.
3 SHEETS—SHEET 3.

Inventor.
Guy C. Hurrell,
by James L. Norris
Attorney.

UNITED STATES PATENT OFFICE.

GUY CLEMENT HURRELL, OF LONDON, ENGLAND.

FILTER AND FILTER PRESS.

1,414,132.

Specification of Letters Patent. Patented Apr. 25, 1922.

Application filed September 27, 1921. Serial No. 503,654.

*To all whom it may concern:*

Be it known that I, GUY CLEMENT HURRELL, a subject of the King of Great Britain, residing in London, England, have invented certain new and useful Improvements in Filters and Filter Presses, (for which I have filed application in Great Britain, dated September 9, 1920, Serial No. 25,937,) of which the following is a specification.

This invention relates to an improved form of permeable medium or covering for filter drums, cylinders or other vessels, which are preferably circular in cross section, but which may be oval or elliptical, ovoid or other form in which the surfaces are concave. It is realized that flat surfaces may be covered by the improved medium, but not so advantageously as in the cases of surfaces which are cylindrical or thereunto approaching. While the pervious covering comprised by this invention is principally suitable for the purpose of filtration, or the separation of solid particles from a fluid in which the said particles are in suspension, it may be advantageously used to filter or extract solid particles suspended in air or other gases, and it is further adapted for the formation of screens for the purpose of sifting or separating solid particles of various size, and for this purpose apertures of definite size may be made more minute than by any other known method in which robust or substantial material is used in the construction of the sieve or screen.

In the accompanying drawings:—

Figs. 1, 2 and 2ª, and 3 are views in plan, to a magnified scale, of different forms of a pervious medium or covering made in accordance with this invention.

Fig. 4 is a side elevation showing apparatus for indenting wires and winding them on a cylindrical filter drum to form a pervious medium.

Fig. 5 is a side elevation showing a modification of the above apparatus.

Fig. 6 is a similar view showing the application of the covering to an elliptical or oval form of filter drum.

Fig. 7 is a sectional elevation of a filter unit of a pressure or vacuum filter in which the improved filtering medium is used.

Fig. 8 is a cross section of the filter unit in Fig. 7.

In the different figures of the accompanying drawings like parts are indicated by the same letter.

Figure 9:
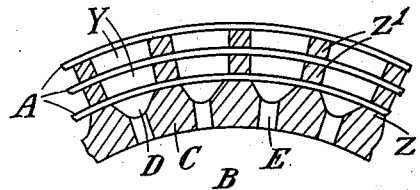
Fig. 9 is a cross section of a portion of a filter drum in which a plurality of coverings are superimposed.

In carrying out this invention a wire A, or a pair of wires A and $A_1$ to be further described, is wound upon suitably prepared surfaces of the hollow vessels, cylinders, drums or the like (hereinafter referred to as drums) B.

A drum B, suitable to receive the wires A or pairs of wires A and $A_1$, is constructed as follows:—

A rigid shell C, of metal, wood or other material has cast or formed upon it longitudinal grooves or hollows D separated from each other by narrow ridges Z: the grooves have holes E making communication through the walls C to the interior of the drum.

Instead of these ridges and grooves being formed out of the material of the drum, I may use a drum having a uniform smooth surface and form my ridges or their equivalent by stretching in an axial direction wires or rods spaced at suitable circumferential intervals, or, as a further alternative, the shell of the drum may be pierced by holes or slots so that a minimum of the length of the wires A and $A_1$ press against the solid material and a maximum of the underside of the medium is exposed to the inside of the drum.

The wire A above mentioned, whether wound in conjunction with another wire $A_1$ or not, is subjected either at the time of its winding on the drum, or previously, to a process of deformation so that inequalities are formed upon the sides of the wires regarded in the plane of covering. The inequalities may be formed in several ways. Fig. 1 shows a wire A to which a slight wave has been imparted and which is wound in conjunction with a straight wire $A_1$. Fig. 2 shows a similar pair of wires of which one, A, has been passed through a pair of indenting rollers or the like, so that portions $A_2$ of the sides of the wire are compressed or indented so that short sections $A_3$ of the original width of the wire form spacing bridges between the alternate plain wires:

the amount of this indenting may be quite small and need not exceed one thousandth ($\frac{1}{1000}$) of an inch, and may be varied to meet the requirements of the substances to be filtered.

Fig. 2$^a$ shows the same result achieved by indenting wire A in the opposite plane to that in Fig. 2, so that the spacing bridges $A_3$ are wider than the normal diameter of the wire.

Fig. 3 shows a method of indenting or crimping the wire A so that an equal spacing will be obtained without the intervention of the plain wire $A_1$. In all the figures the amount of the projection $A_3$ has been shown exaggerated in proportion to the diameter of the wire in comparison with the usual requirements in practice.

The indenting or the imparting of the wave form to the wire may be done previously on separate machines, but I prefer to do it at the same time as the wire is wound on to the drum: and Fig. 4 shows a suitable appliance for indenting the wire as in Figs. 1, 2 and 3, and Fig. 5 shows a similar appliance for indenting the wire in the opposite plane, as shown at Fig. 2$^a$.

In Figs. 4 and 5, P is a holder so mounted and carried in connection with the drum, that for each rotation of the drum it travels parallel with the axis a distance equal to the width of the pair of wires; or a single wire in the case of the method shown in Fig. 3: this movement can be carried out by the employment of the well-known lead screw and change wheels of the ordinary screw cutting lathe.

The wires A and $A_1$ contained upon bobbins Q and $Q_1$ are coiled upon the surface of the drum B by the rotation of the latter, the wire $A_1$ being kept at a suitable tension only, and the wire A is drawn through the indenting rollers R and, when desired, the rollers may have their rotation assisted by some other means than the pull of the wires A, as it is found in practice that in exerting the required pull to draw it through the indenting rollers the wire is sometimes broken.

The spring actuated finger S is also provided to ensure that each convolution of the wire or wires shall be pressed closely against the preceding one. The manner in which the finger S functions is self explanatory from the drawings.

Any desired number of layers of indented or waved wires may be superimposed to form a less pervious covering, as shown in Fig. 9, preferably with longitudinal separating rods or wires $Z_1$ between successive layers as the spaces Y tend to become charged with the solid material and thus prevent small solid particles being drawn through with the liquid: if the gaps between wires of the outer layers are made larger progressively, a reverse flow of the air, liquid or wash water under internal pressure can be used to clean the accumulated collection of solid material between the layers.

The method of winding superimposed layers is also adopted where the separation of the fluids from the solids is carried out under pressure, the succeeding layers imparting great strength against bursting of a cylindrical filter press in the same manner as the breach chamber of a wire-wound gun is strengthened.

Figure 10:
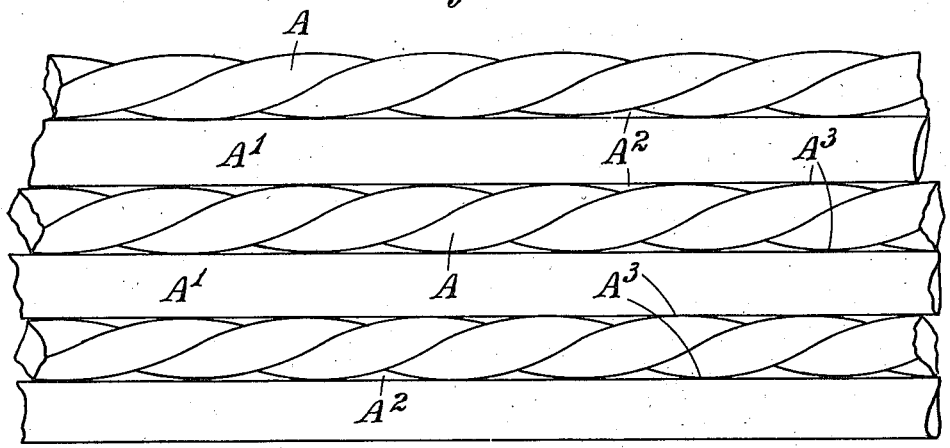
Fig. 10 is a plan view, to a magnified scale, of a modified form of the improved pervious medium.

Figs. 10 and 11 illustrate two further modifications, in each case a construction embodying two wires A and $A_1$ being shown. In Fig. 10 the wire A, used in conjunction with the plain wire $A_1$, is of square, oblong, oval, elliptical, polygonal, cruciform, or other than circular form in cross section, having one or more pairs of major and minor axes, and is, before being wound on the drum, twisted into a spiral of short pitch, so that points $A_3$ on the major axis or axes, touch the sides of adjoining wires, and helical or oblique passages $A_2$ are formed, of which the maximum size is equal to the difference between the greater and lesser radii of the section of the wire, if wound, as shown in conjunction with a plain wire $A_1$, or twice that amount if no plain wire is used.

In the construction shown in Fig. 11, the wire A has been shaped by passing it through a cutter similar in action to a screw-threading die, so that parts $A_3$ of the sides of the wire at the top of the thread formed thereon, touch the sides of the wire $A_1$, or the preceding and following convolutions of the wire A, as the case may be.

Instead of a solid wire, a cable consisting of several wires stranded together may be used.

Having thus described the nature of the said invention and the best means I know of carrying the same into practical effect, I claim:—

1. In filtering, sieving or screening machines, a separating device comprising in combination, a rigid hollow drum having on the external surface of its wall alternating longitudinal grooves and ridges, said grooves having holes in their bottom making communication through said walls to the interior of the drum, and a pervious covering applied to the said wall surface, said covering consisting of contiguous convolutions of wire coiled on the drum, the wire constituting a number of the convolutions being so shaped that passages communicating with the said grooves are formed between adjacent sides of the wire convolutions.

2. In filtering, sieving or screening machines, a separating device comprising in combination, a rigid hollow drum having on the external surface of its wall alternating longitudinal grooves and ridges, said grooves having holes in their bottom making communication through said walls to the interior of the drum, and a pervious covering applied to the said wall surface, said covering consisting of a number of contiguous convolutions of wire, coiled on the drum, the wires constituting a number of the convolutions being formed with inequalities upon their sides in the plane of the covering, whereby passages communicating with the said grooves are formed between adjacent sides of the wire convolutions.

3. In filtering, sieving or screening machines, a separating device comprising in combination, a rigid hollow drum having on the external surface of its wall alternating longitudinal grooves and ridges, said grooves having holes in their bottom making communication through said walls to the interior of the drum, and a pervious covering applied to the said wall surface, said covering consisting of alternate convolutions of a pair of wires coiled contiguously on the drum, one of the wires being of uniform cross section and parallel sided, and the other wire being so shaped that open passages communicating with the grooves are formed at intervals between the sides of said wire and of the parallel sided wire when coiled on the drum.

4. In filtering, sieving or screening machines, a separating device comprising in combination, a rigid hollow drum having on the external surface of its wall alternating longitudinal grooves and ridges, said grooves having holes in their bottom making communication through said walls to the interior of the drum, and a pervious covering applied to the said wall surface, said covering consisting of alternate convolutions of a pair of wires coiled contiguously on the drum, one of the wires being of uniform cross section and parallel sided and the other wire having inequalities upon its sides in the plane of the covering, the inequalities being arranged to contact with the sides of the parallel sided wire, passages communicating with the said grooves being thereby formed between the sides of adjacent convolutions.

5. In filtering, sieving or screening machines, a separating device comprising in combination, a rigid hollow drum having on the external surface of its wall alternating longitudinal grooves and ridges, said grooves having holes in their bottom making communication through said walls to the interior of the drum, and a pervious covering applied to the said wall surface, said covering consisting of alternate convolutions of a pair of wires coiled contiguously on the drum, one of the wires being of uniform cross section and parallel sided and the other wire being of varying form in cross section and provided with projections on its sides, the said projections being in the plane of the covering and arranged to contact with the sides of the convolutions of the parallel sided wire, passages communicating with the said grooves being thereby formed between the sides of adjacent convolutions.

6. In filtering, sieving or screening machines, a separating device comprising in combination, a rigid hollow drum having on the external surface of its wall alternating longitudinal grooves and ridges, said grooves having holes in their bottom making communication through said walls to the interior of the drum, and a pervious covering applied to the said wall surface, said covering consisting of contiguous convolutions of wire coiled on the drum, the wire constituting a number of the convolutions being of a cross section having a pair of major and minor axes and being twisted on its axis whereby helical passages communicating with the grooves are formed between the sides of adjacent convolutions.

7. In filtering, sieving or screening machines, a separating device comprising in combination a rigid hollow drum having on the external surface of its wall alternating longitudinal grooves and ridges, said grooves having holes in their bottom making communication through said walls to the interior of the drum, and a pervious covering applied to the said wall surface, said covering consisting of alternate convolutions of a pair of wires coiled contiguously on the drum, one of the wires being of uniform cross section and parallel sided and the other wire being of a cross section having a pair of major and minor axes and being twisted on its axis whereby helical passages communicating with the grooves are formed between the sides of adjacent convolutions.

8. In filtering, sieving or screening machines, a separating device comprising in combination, a rigid hollow drum having on the external surface of its wall alternating longitudinal grooves and ridges, said grooves having holes in their bottom making communication through said walls to the interior of the drum, and a pervious covering applied to the said wall surface, said covering consisting of a number of layers and longitudinally disposed rods separating the layers, said layers each consisting of contiguous convolutions of wire coiled on the drum, the wire constituting a number of the convolutions being shaped so that passages communicating with the said grooves are formed between adjacent sides of the wire convolutions.

In testimony whereof I have signed my name to this specification.

GUY CLEMENT HURRELL.